(No Model.)

J. H. SHEEHAN.
NUT LOCK.

No. 307,147. Patented Oct. 28, 1884.

Witnesses.
M. H. Harlow
John B. B. Fiske

Inventor.
James Henry Sheehan

UNITED STATES PATENT OFFICE.

JAMES HENRY SHEEHAN, OF BANGOR, MAINE.

NUT-LOCK.

SPECIFICATION forming part of Letters Patent No. 307,147, dated October 28, 1884.

Application filed May 23, 1884. (No model.)

*To all whom it may concern:*

Be it known that I, JAMES HENRY SHEEHAN, a citizen of the United States, residing at Bangor, in the county of Penobscot and State of Maine, have invented a new and useful Nut-Lock; and I do hereby declare that the following is a full, clear, and exact description of the invention, which will enable others skilled in the art to which it appertains to make and use the same.

My invention consists of an improvement upon a nut-lock invented and patented by me under Letters Patent No. 282,383, dated July 31, 1883. In practice I have found some additional constructions and formations desirable to perfect the operation and effectiveness of my nut-lock.

Figure 1:
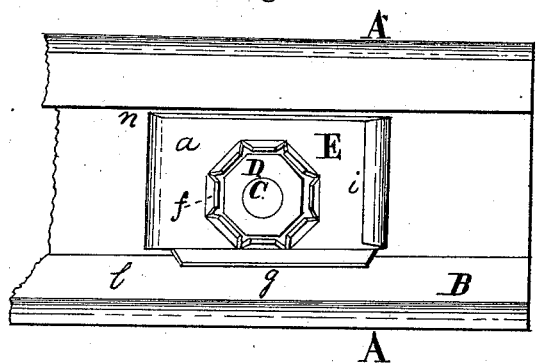
Figure 2:
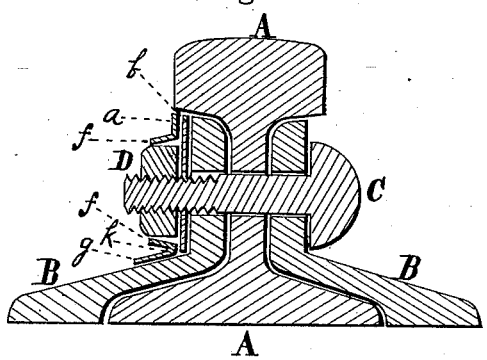
Figure 3:
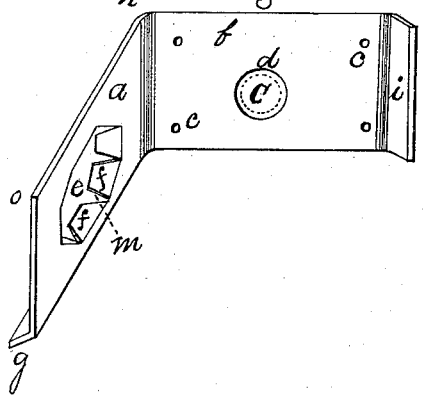

In the accompanying drawings similar letters refer to corresponding parts throughout the several figures. Figure 1 shows an elevation or side view of an ordinary rail with my invention in actual use. Fig. 2 shows a cross-section of a rail and fish-plates with my invention in actual use. Fig. 3 is a front view of my invention with the locking-plate $a$ swung out and away from the nut and washer-plate $b$.

A is an ordinary rail for railroad use and purposes. B B are fish-plates. C is a screw-bolt. D is a nut. E is a nut-lock. $a$ is the locking or front plate of the lock. $b$ is the back plate or washer-plate of the lock. $d$ is the aperture in the washer-plate to allow it to pass on over the bolt C. $e$ is the flanged aperture of the lock. $ff$ are flanges formed on the locking-plate around the aperture $e$. $g$ is a flange formed on the outside or locking plate $a$. $i$ is a clamp or lip. $k$ is the fold or sharp turn in the formation of the flange $g$. $m\ m$ are slits cut to allow the rim of the nut-aperture to flange without strain on the metal. $o$ is the end of the locking-plate $a$.

In cases where my lock is applied to wood I form screw-holes under the nut D, so that the nut D will cover them when in place, and thus prevent any possibility of the screws in the holes ever becoming loose or getting out.

In my former Patent No. 282,383, dated July 31, 1883, I have secured certain parts and operations of a nut-lock, and it is my present intention to secure additional improvements and functions.

In construction I provide a suitable strip of any thin pliable metal—such as galvanized iron—and perforate it to form the circular aperture $d$ to pass over the bolt C. I then form the aperture $e$ with the flanges or flanged rim $f$, and bend the strip nearly in the middle of its length, as at $n$, to form the washer-plate $b$ and the front or locking plate, $a$. The washer-plate $b$ is intended to fit on over the bolt and behind the nut D, against the fish-plate B, and to be held in position by the nut D when screwed into place. The front or locking plate, $a$, is intended to be bent or folded back onto the washer-plate $b$, the aperture $e$ fitting over the nut D and the flanges or flanged edges $f$, clasping the nut and holding it securely in its proper position and entirely preventing it from turning or rotating.

In order to secure the outer or locking plate, $a$, and prevent it from slipping off from the nut, I form the lip $i$ in extension of the washer-plate $b$, of a suitable length to bend over onto and outside of the end $o$ of the locking-plate $a$, thus holding the plate $a$ securely in place and preventing any possibility of its slipping off the nut.

In this nut-lock as described the washer-plate and the locking-plate are integral, and the plates forming the nut-lock operate to prevent any turning or rotation of the nut by the contact of the edges of the plates against the flanges of the rail or the fish-plate, and it is not necessary that there should be two flanges to secure the effective working of the lock; but one flange or any projecting ledge of wood or metal is sufficient; and the washer-plate may be secured by nails or screws through holes to any wood or penetrable substance, and thus act as effectively as if acting against the flange of a rail. In this description of lock the plates are integral.

In the nut-lock which I have described the resistance to turning or rotation of the nut is effected by the contact of the edges with the flange or flanges of a rail or fish-plate; but when desirable my lock can be applied to wood-work, and the plates can be fixed stationary by screws or nails used through holes provided for that special purpose. In forming the flanged rims $ff$ to the aperture $e$, intended to clasp the nut, it is necessary to make cuts or incisions m, to allow the metal to spread and form the flange.

What I claim, and desire to secure by Letters Patent, is—

1. In a nut-lock formed with the washer-plate b and locking plate a formed integral, the folding lip or clamp i, folding or bending down onto or outside of the locking-plate a when pressed over the nut D and against the washer-plate b, to hold or clamp the plate a in position and prevent it from springing off and releasing the nut.

2. In a nut-lock, the combination of the washer-plate b, formed with the clamping-lip i, to bend or clamp onto the plate a, and the nut-locking plate a, formed with the flange g, when used to form a nut-lock, as shown and described.

JAMES HENRY SHEEHAN.

Witnesses:
W. H. HAELON,
JOHN B. B. FISKE.